United States Patent
Calamera et al.

(10) Patent No.: US 9,729,585 B2
(45) Date of Patent: Aug. 8, 2017

(54) COMMUNICATIONS ADAPTOR FOR USE WITH INTERNET TELEPHONY SYSTEM

(71) Applicant: VONAGE NETWORK, LLC, Holmdel, NJ (US)

(72) Inventors: Pablo Calamera, New York, NY (US); Deepak Ottur, Hillsborough, NJ (US); Rohan Dwarkha, Mendham, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 14/625,421

(22) Filed: Feb. 18, 2015

(65) Prior Publication Data
US 2016/0241606 A1    Aug. 18, 2016

(51) Int. Cl.
*H04L 29/06* (2006.01)
*H04M 7/00* (2006.01)

(52) U.S. Cl.
CPC ........ *H04L 65/1069* (2013.01); *H04L 65/103* (2013.01); *H04L 65/1026* (2013.01); *H04L 65/1053* (2013.01); *H04M 7/006* (2013.01)

(58) Field of Classification Search
CPC .................................................. H04L 65/1069
See application file for complete search history.

(56) References Cited

U.S. PATENT DOCUMENTS

| | | | |
|---|---|---|---|
| 7,881,449 B2 * | 2/2011 | Hanson | H04M 3/42153 379/201.02 |
| 8,804,697 B1 * | 8/2014 | Capper | H04L 65/00 370/352 |
| 2005/0069097 A1 * | 3/2005 | Hanson | H04M 3/42153 379/88.12 |
| 2005/0135342 A1 * | 6/2005 | Kim | H04M 7/0057 370/352 |
| 2005/0152347 A1 * | 7/2005 | Chen | H04L 12/66 370/356 |
| 2006/0007915 A1 * | 1/2006 | Frame | H04M 7/0069 370/352 |

(Continued)

OTHER PUBLICATIONS

Grandstream Networks, Inc. HT503 User Manual, "FXS/FXO Port Analog Telephone Adaptor", Firmware Version 1.0.12.4, Jun. 5, 2007.

(Continued)

*Primary Examiner* — Jason Mattis
(74) *Attorney, Agent, or Firm* — Nixon & Vanderhye P.C.; Joseph Pagnotta

(57) ABSTRACT

A communications adaptor comprising an adaptor first port; an adaptor second port; an adaptor third port; and a processor. The adaptor first port is configured to connect to an analog communications line. The adaptor second port is configured to connect to a data network. The adaptor third port is configured to connect to an analog telephony device. The processor is configured to determine that a first call setup request signal has been received at the adaptor first port. The processor is further configured, subsequent to such determination: (1) to transmit a second call setup request signal over the adaptor second port to an Internet Protocol (IP) telephony system over the data network; and (2) to transmit a third call setup request signal over the adaptor third port.

24 Claims, 9 Drawing Sheets

(56) References Cited

U.S. PATENT DOCUMENTS

| | | | |
|---|---|---|---|
| 2007/0223455 A1* | 9/2007 | Chang | H04M 7/0057 370/352 |
| 2008/0112392 A1* | 5/2008 | Mansfield | H04L 12/66 370/352 |
| 2008/0130628 A1* | 6/2008 | Lin | H04L 12/66 370/352 |
| 2008/0192655 A1* | 8/2008 | Vagelos | H04M 3/42263 370/259 |
| 2008/0253543 A1* | 10/2008 | Aharon | H04M 3/42195 379/201.12 |
| 2012/0207172 A1 | 8/2012 | Emmanuel | |

OTHER PUBLICATIONS

International Search Report and Written Opinion mailed Apr. 29, 2016 in PCT application PCT/US2016/018443.

* cited by examiner

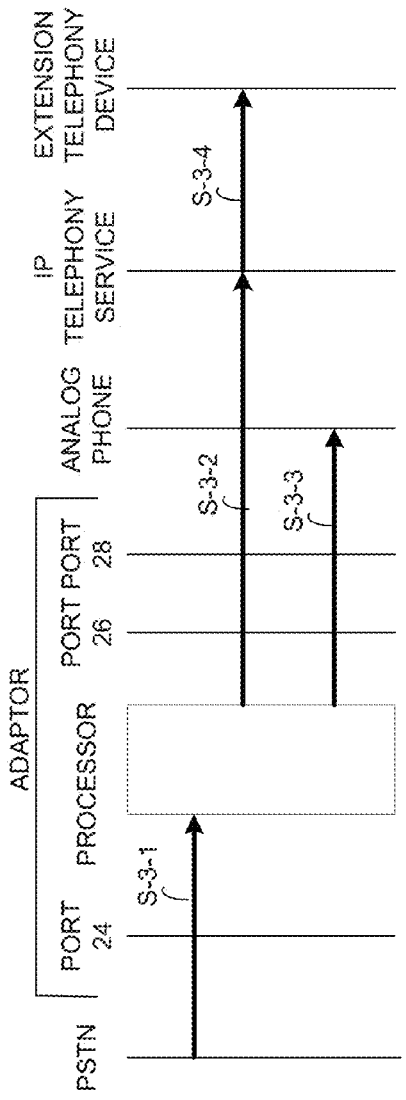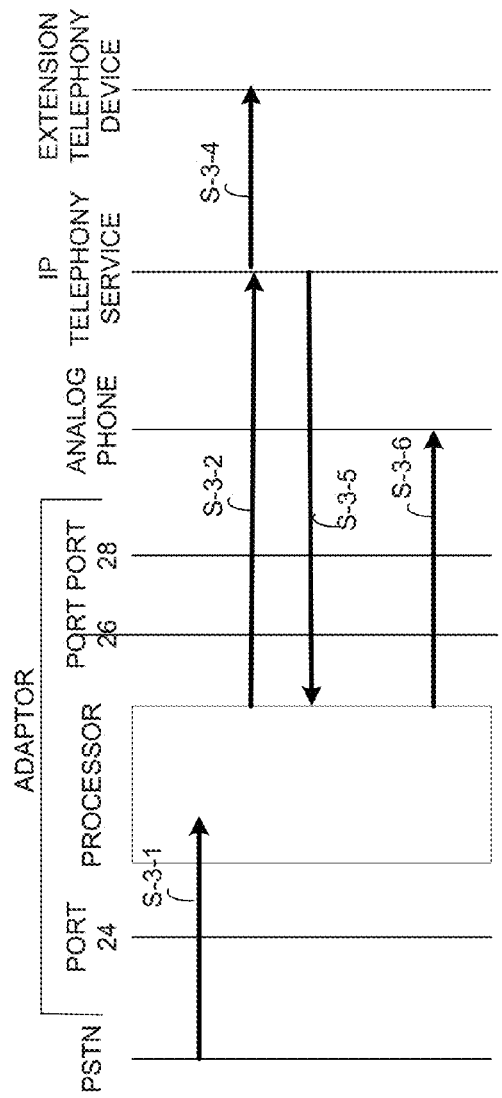

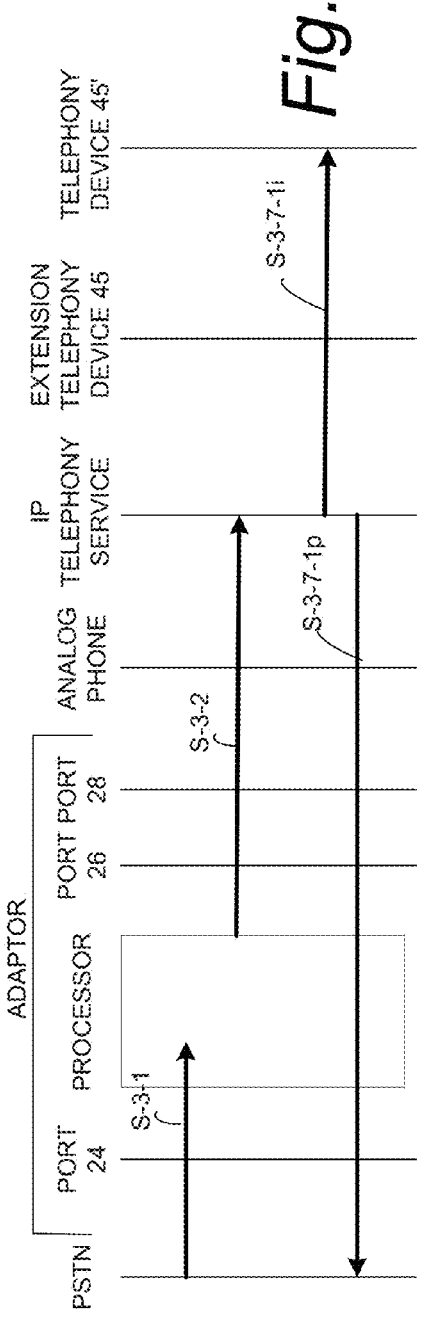
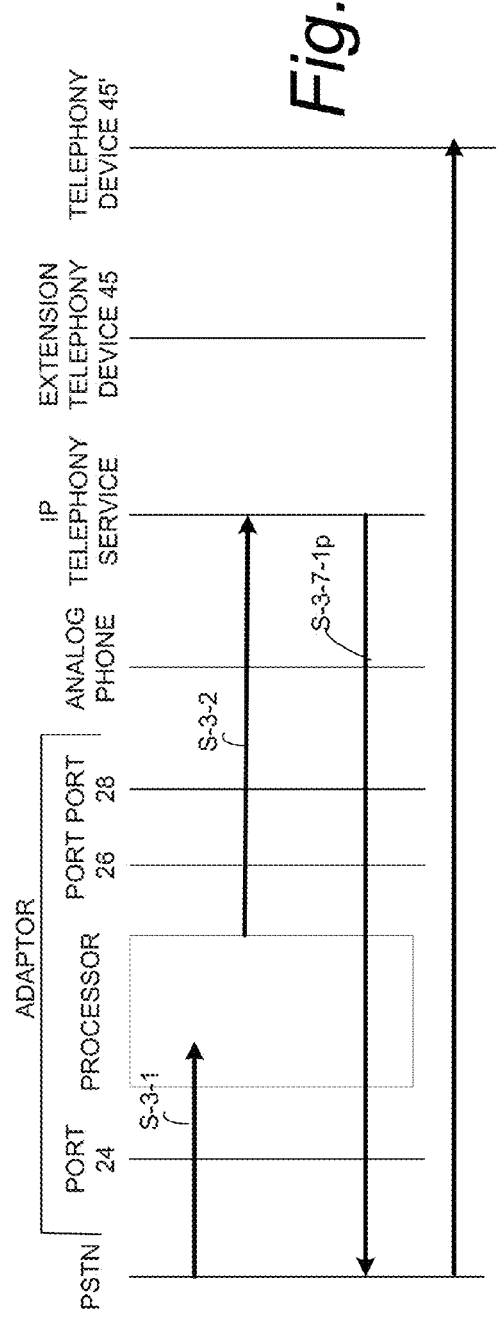

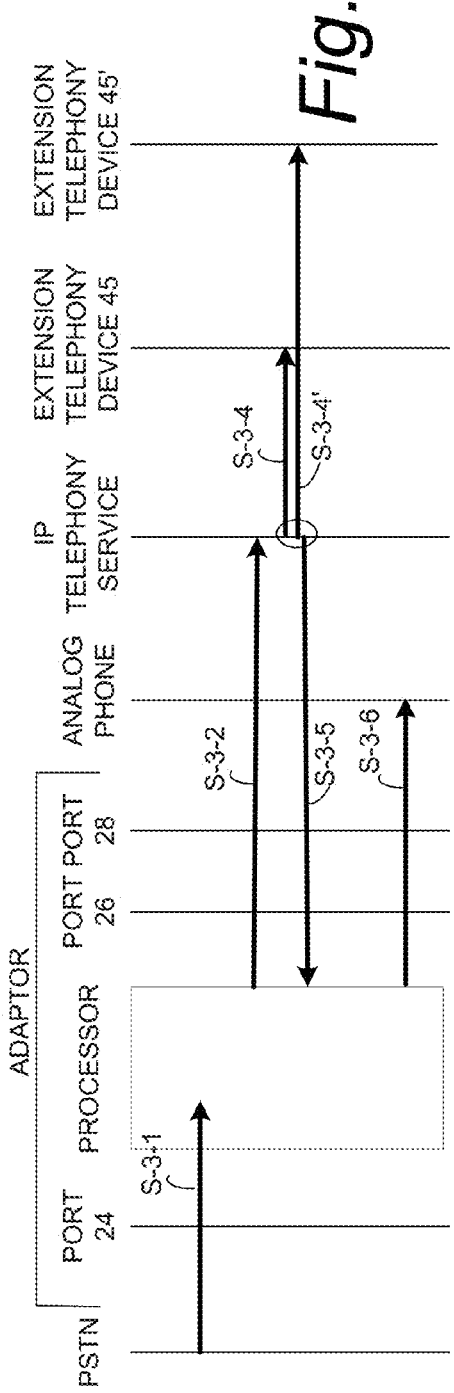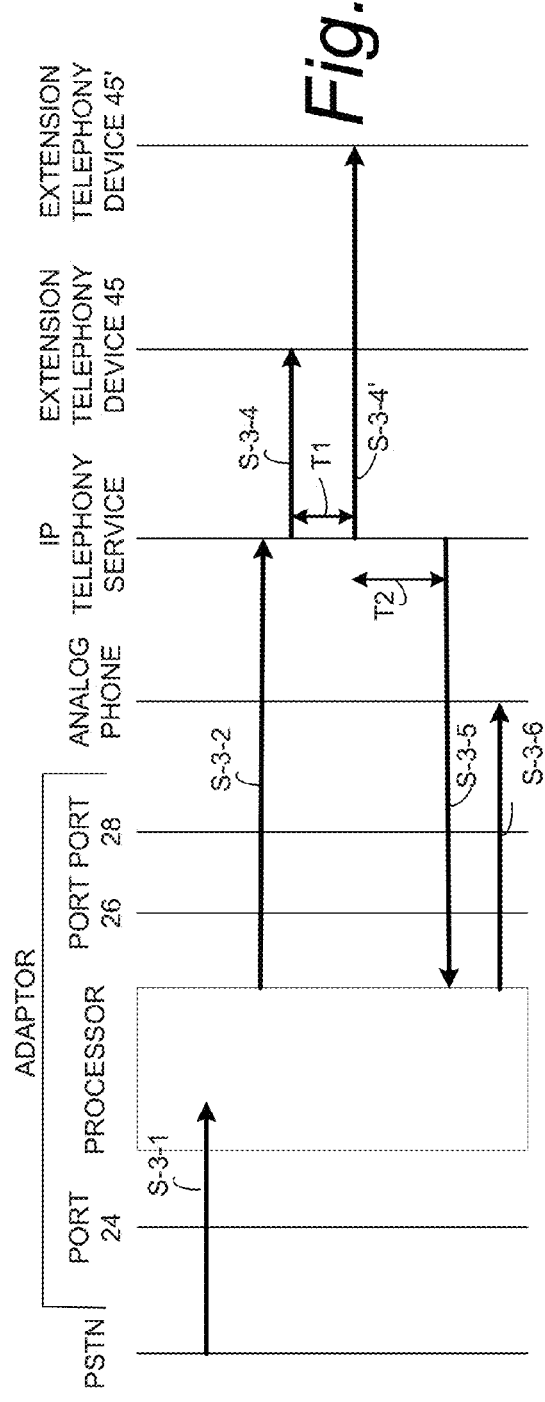

1

COMMUNICATIONS ADAPTOR FOR USE WITH INTERNET TELEPHONY SYSTEM

TECHNICAL FIELD

The technology relates to telecommunications, and in particular to devices such as a communication adaptor or terminal adaptor that facilitates use of an Internet Protocol (IP) telephone system.

BACKGROUND

An Internet Protocol (IP) telephony system routes various types of communications, at least in part, via data packets that are communicated over a data network. The data network is commonly the Internet. The types of communications may be, for example, telephone calls, video calls, text and video messages, and other forms of telephony and data communications. The users of the Internet Protocol (IP) telephony system typically gain access to the Internet using an Internet service provider so that they can communicate via the IP telephony system.

Customers of an IP telephony system can place and receive telephone calls using various types of telephony devices. One type of telephony device is an IP telephone that is typically connected to an Internet service provider via a wired connection or router. Another type of telephony device is a soft-phone client running on a computer which can place and receive IP based telephone calls. Yet another type of telephony device is a mobile telephony device such as a mobile computing device, mobile phone or the like which has wireless transmission and reception capabilities, and is connected to a wireless router or to a base station of a cellular network, for example using WiFi or cellular telephone technology.

Another type of telephony device is an analog telephone which is connected to the Internet via terminal adaptor. The terminal adaptor converts analog signals from the telephone into data signals that pass over the Internet, and vice versa. In some embodiments multiple analog telephones may be coupled to the same terminal Analog telephone devices include, but are not limited to, standard telephones and document imaging devices such as facsimile machines. A configuration using a terminal adaptor is common where one or more analog telephones are located in a residence or business, and all of the telephones are connected to the same terminal adaptor. With this configuration, all of the analog telephones may share the same telephone number assigned to the terminal.

One example terminal adaptor is the HT503 FXS/FXO Port Analog Telephone Adaptor sold by Grandstream Networks, Inc., and described in a HT503 User Manual. The HT503 adaptor has an FXO port which is connected to the plain old telephone system (POTS), an FXS port which is connected to an analog telephone, and a WAN port which is connected to an IP telephony network through a data network such as the Internet. The HT503 adaptor allows the analog telephone to answer calls which are incoming from the IP telephony network and to place outbound calls using the IP telephony network. The HT503 adaptor also supports routing incoming calls received at the FXO port to the SIP network (IP telephony system) as part of out-of-box functionality. However, the HT503 adaptor does not support routing incoming calls received at the FXO port to both an IP telephony system and to an analog telephone for the same incoming call. Rather, the HT503 adaptor routes the incoming call to one or the other of the IP telephony system and the analog telephony, but not both.

A processor in the HT503 adaptor converts signaling and user traffic between the FXS port (which is connected to the analog telephone) and the WAN port (which is ultimately connected to the IP telephony system). In some instances certain outbound calls from the analog telephone may be directed by the processor to the POTS-connected FXO port, such as emergency calls or calls that are preceded by a special prefix or code which indicates that the calls are not to be handled by the IP telephony system.

In view of their digital, packetized operation, IP telephony systems may provide various services that enhance a customer's telephony experience and provide expanded or additional capabilities, particularly when dealing with inbound calls. But when using a prior art adaptor, an analog telephone connected to the prior art adapter is not able to participate in such enhanced or expanded services for a POTS-originated call.

SUMMARY

In one of its aspects the technology disclosed herein concerns a communications adaptor comprising an adaptor first port; an adaptor second port; an adaptor third port; and a processor. The adaptor first port is configured to connect to an analog communications line. The adaptor second port is configured to connect to a data network. The adaptor third port is configured to connect to an analog telephony device. The processor is configured to determine that a first call setup request signal has been received at the adaptor first port. The processor is further configured, subsequent to such determination: (1) to transmit a second call setup request signal over the adaptor second port to an Internet Protocol (IP) telephony system over the data network; and (2) to transmit a third call setup request signal over the adaptor third port.

In an exemplary embodiment and mode the second call setup request signal includes an indication that the first call setup request was received at the adaptor first port.

In an exemplary embodiment and mode the processor is further configured to provide the IP telephony system with an account identifier of a subscriber associated with the communications adaptor.

In an exemplary embodiment and mode the processor is configured to generate the third call setup request signal by converting the second call setup request signal from digital to analog format.

In an exemplary embodiment and mode the processor is further configured to substantially simultaneously transmit the third call setup request signal over the adaptor third port and transmit the second call setup request signal over the adaptor second port.

In an exemplary embodiment and mode the processor is further configured to transmit the second setup request signal to the adaptor third port at a time delay after transmission of the second setup request signal to the Internet Protocol (IP) telephony system.

In an exemplary embodiment and mode the processor is configured to generate the third setup request signal upon receipt of a fourth setup request signal received from the Internet Protocol (IP) telephony system. In an example implementation the processor is configured to convert the fourth setup request signal to the third setup request signal.

In an exemplary embodiment and mode the processor is further configured to receive an off hook condition indication from the analog telephony device; and in accordance with the off hook condition indication to cancel the second setup request signal to the IP telephony system over the data network. In an example implementation the processor is further configured in accordance with the off hook condition indication to generate a notification signal to the IP telephony system with information to enable the IP telephony system to make a record of the incoming communication.

In an exemplary embodiment and mode the processor is further configured to receive an off hook condition indication of an extension telephony device registered with the IP telephony system; and in accordance with the off hook condition indication to cancel the third setup request signal to the analog telephony device.

In an exemplary embodiment and mode the processor is further configured to make a determination regarding unavailability of the data network; and in accordance with the unavailability determination, to route communications between the adaptor first port and the adaptor third port.

In an exemplary embodiment and mode the processor is configured by default to connect the adaptor third port to the adaptor second port when the analog telephone device initiates an outbound communication unless the processor receives a default override indication. In an exemplary implementation the processor is configured to generate a notification signal to the IP telephony system with information to enable the IP telephony system to make a record of the outbound communication.

In another of its aspects the technology disclosed herein concerns a method of operating a communications adaptor. The method comprises receiving at an adaptor first port of the communications adaptor a first setup request signal for an incoming communication carried over an analog communications line; generating a second setup request signal for transmission to an Internet Protocol (IP) telephony system over a data network connected to an adaptor second port of the communications adaptor when the first setup request signal for the incoming communication is received over the analog communications line; and generating a third setup request signal for the incoming communication received over the analog communications line for transmission to an adaptor third port of the communications adaptor. The adaptor third port of the communications adaptor is connected to an analog telephony device.

In an exemplary embodiment and mode the second setup request signal is a digital setup request signal and the third setup request signal is an analog setup request signal.

In an exemplary embodiment and mode the method further comprises configuring the second setup request signal for transmission to an Internet Protocol (IP) telephony system to include an indication that the incoming communication was received at the adaptor first port.

In an exemplary embodiment and mode the method further comprises generating the third setup request signal by converting the second setup request signal transmitted to the Internet Protocol (IP) telephony system.

In an exemplary embodiment and mode the method further comprises transmitting the third setup request signal to the adaptor third port simultaneously with the generation of the digital setup request signal for transmission to an Internet Protocol (IP) telephony system.

In an exemplary embodiment and mode the method further comprises transmitting the third setup request signal to the adaptor third port at a time delay after transmission of the second setup request signal to the Internet Protocol (IP) telephony system.

In an exemplary embodiment and mode the method further comprises configuring the time delay to allow the Internet Protocol (IP) telephony system to perform a call enhancement service.

In an exemplary embodiment and mode the method further comprises performing call forwarding, simultaneous ring, or sequential ring as the call enhancement service.

In an exemplary embodiment and mode the method further comprises receiving an off hook condition indication from the analog telephony device; and, in accordance with the off hook condition indication, cancelling the second setup request signal to the IP telephony system over the data network.

In an exemplary embodiment and mode the method further comprises receiving an off hook condition indication from an extension telephony device registered with the IP telephony system; and in accordance with the off hook condition indication canceling the third setup request signal to the analog telephony device.

In an exemplary embodiment and mode the method further comprises receiving a fourth setup request signal from the IP telephony system; and using the fourth setup request signal to generate the analog setup request signal for transmission to the adaptor third port. In an exemplary implementation the method further comprises generating the third setup request signal by converting the fourth setup request signal from digital to analog.

In another of its aspects the technology disclosed herein concerns a method of operating an Internet Protocol (IP) telephony system. In its basic form the method comprises receiving a setup request signal from a communications adaptor, the setup request signal including an indication that the setup request signal was generated as a result of receipt by the communications adaptor of a setup request signal from a public switched telephony network (PSTN); and generating an IP-formatted setup request signal to at least one extension telephony device which is registered with the IP telephony system.

In an exemplary embodiment and mode an analog telephony device connected to the communications adaptor is included in the at least one extension telephony device.

In an exemplary embodiment and mode the method further comprises performing a call enhancement service which affects how the IP-formatted setup request signal is sent to the at least one extension telephony device.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 4A is a diagrammatic view showing signaling associated with an Internet Protocol (IP) telephony system performing certain basic acts in accordance with the generic mode of FIG. 1A.

FIG. 4B is a diagrammatic view showing signaling associated with an Internet Protocol (IP) telephony system performing certain basic acts in accordance with the example IP network controlled mode of FIG. 1B FIG. 4C(1)-FIG. 4C(4) are diagrammatic view showing various implementations of signaling associated with an Internet Protocol (IP) telephony system performing certain basic acts in accordance with the example enhanced service mode of FIG. 1C.

DETAILED DESCRIPTION

Figure 1A:
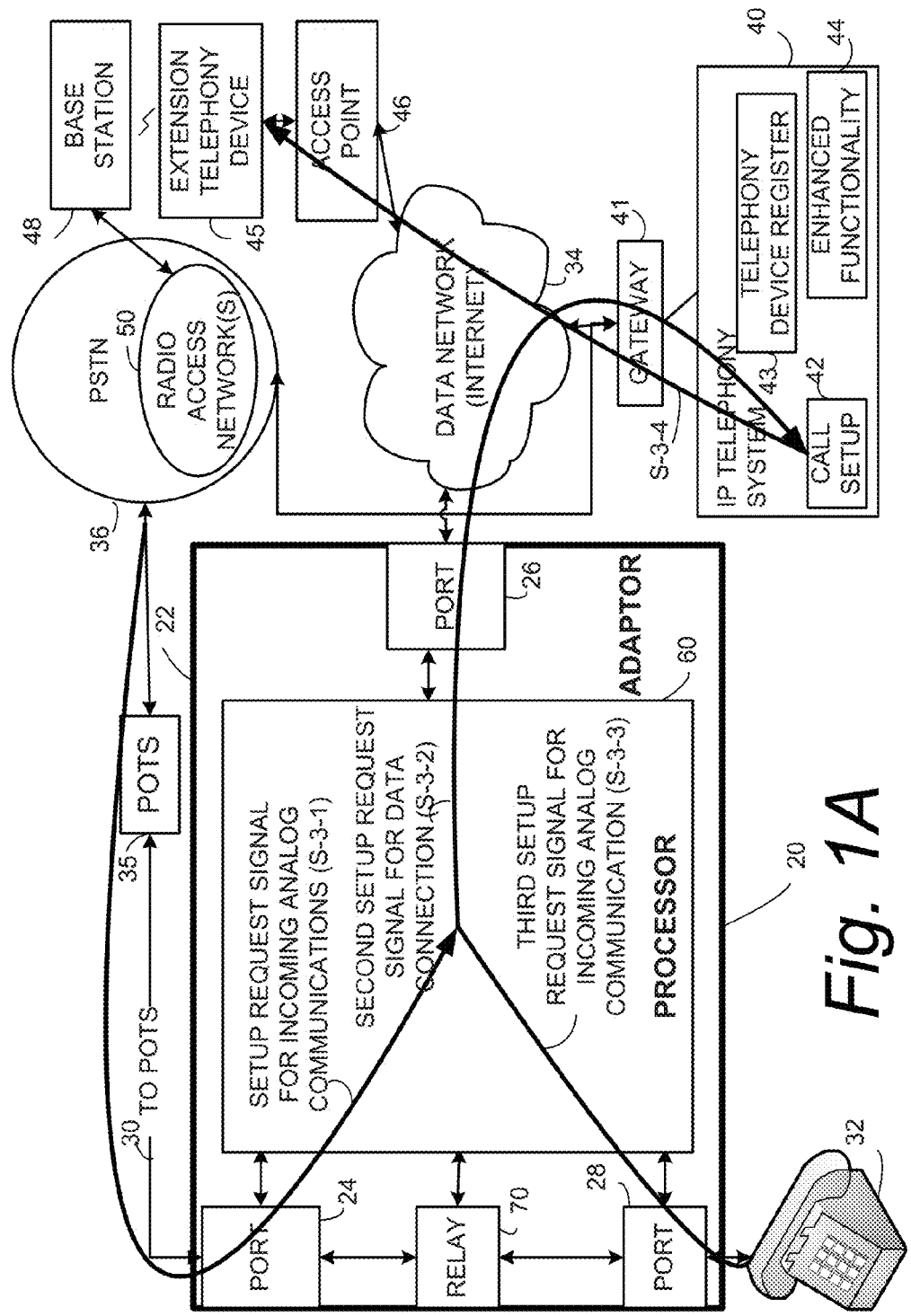
FIG. 1A is a diagrammatic view of a telephony communications adaptor associated with an Internet Protocol (IP) telephony system in accordance with an example embodiment with the telephony communications adaptor performing certain basic acts in accordance with a generic mode.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In this description, the terms "VoIP system", "VoIP telephony system", "IP system" and "IP telephony system" are all intended to refer to a system that connects callers and that delivers data, text and video communications using Internet Protocol data communications.

In this description references are made to an "IP telephony device" or "telephony device". These terms are used to refer to any type of device which is capable of interacting with an IP telephony system to complete a telephone call, including but not limited to those already described above. An IP telephony device could be an IP telephone, a computer running IP telephony software, a terminal adaptor which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

This description also refers to a mobile telephony device. The term "mobile telephony device" is intended to encompass multiple different types of devices. In some instances, a mobile telephony device could be a cellular telephone. In other instances, a mobile telephony device may be a mobile computing device that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. That is, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

This description also refers to telephony communications ("communications") and telephony activity. These terms are intended to encompass all types of (telephony) communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

FIG. 1A shows a telephony communications adaptor 20 which is also simply referred to as an "adaptor" or "terminal adaptor". The adaptor 20 comprises adaptor housing 22 which may take any desired shape or size, but is shown for sake of convenience in FIG. 1A as being an essentially rectangular frame with walls on all faces thereof. The adaptor housing 22 comprises various adaptor ports, including adaptor first port 24, adaptor second port 26, and adaptor third port 28. Adaptor first port 24 is configured to connect to an analog communications line 30. Adaptor second port 26 is configured to connect to a data network 34. Adaptor third port 28 is configured to connect to an analog telephony device 32. The ports 24, 26, and 28, as well as other unillustrated ports and power supply connections may be accessible through the adaptor housing 22.

The analog communications line 30 is connected to an analog or "circuit switched" type telephony network such as the type traditionally termed the "plain old telephone system" ("POTS") 35. Generally "POTS" refers to the plain old telephone service provided over analog copper loops. POTS lines are typically connected to the public switched telephony network (PSTN) 36 at a central office via Class 5 telephone switches. Thus, through the analog communications line 30 a customer or user associated with the adaptor 20 may have access to one or more fixed network telephony providers or operators.

As mentioned above, the data network 34 to which adaptor second port 26 is connected may be a data network such as the Internet, for example. FIG. 1A further shows that adaptor 20 may be configured or programmed to operate in conjunction with an Internet Protocol (IP) telephony system, e.g., IP telephony system 40. The IP telephony system 40 may be connected to the public switched telephony network (PSTN) 36 through a PSTN gateway 41, which may be either internal to IP telephony system 40 or external.

As shown in FIG. 1A, IP telephony system 40 may comprise various functionalities and units, such as call setup function 42, telephony device register 43, and enhanced service function ("enhanced functionality") 44. The IP telephony system 40 provides IP telephony services to plural customers or users, each customer or user having an account with IP telephony system 40. Each customer or user may have one or more telephony devices registered in telephony device register 43 with the customer's IP telephony network account. In the example scenario shown in FIG. 1A, a customer/user has registered telephony communications adaptor 20 as the user's primary telephony device, but has also registered in telephony device register 43 an extension telephony device 45 with the IP telephony system 40. Thus, telephony device register 43 may keep a record of International Mobile Subscriber Identity (IMSI) values of one or more registered extension telephony devices, along with the associated calling number and/or account identifier.

The extension telephony device 45 may take any of various forms, e.g., any form of telephony device as described herein, including but not limited to an internet phone, a mobile telephony device, or a computer or laptop with or without mobile termination. The extension telephony device 45 may have access to data network 34 (and thus access to IP telephony system 40) through an access point 46 or through a base station 48 of a radio access network 50. Depending on whether the extension telephony device 45 is stationary or mobile, the access point 46 may be (for example) a wired or wireless router. As shown in FIG. 1A, the radio access network 50 may comprise public switched telephony network (PSTN) 36.

It should be understood that more than one extension telephony device 45 may be registered with IP telephony system 40 in conjunction with a customer's account. For example, the customer's account may have one or more internet telephones or mobile telephony devices registered in the telephony device register 43 of IP telephony system 40. The telephony device register 43 may include not only identifications of the extension telephony devices registered with the IP telephony system 40, but locations (e.g., internet addresses or telephone numbers) associated with each.

In addition to its ports, FIG. 1A shows adaptor 20 as comprising processor 60. In an example embodiment processor 60 may comprise computer circuitry 61 of the type illustrated in FIG. 2. Among its other functions, processor 60 is configured to generate a setup request signal for transmission to Internet Protocol (IP) telephony system 40 over data network 34 when a setup request signal for an incoming communication is received at adaptor first port 24.

Figure 3A:
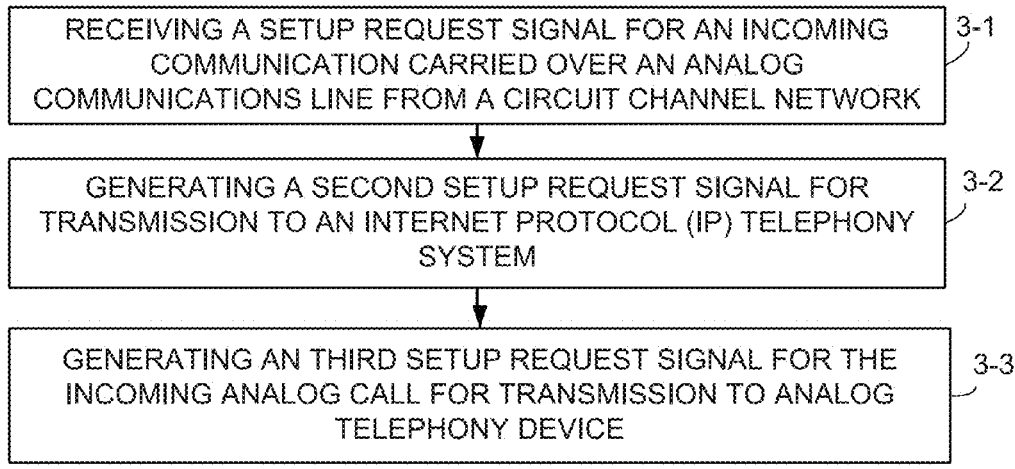
FIG. 3A is a flowchart showing example, representative acts or steps performed by a communications adaptor according to the example generic method of FIG. 1A.

As shown in FIG. 1A, the flowchart of FIG. 3A, and the signal diagram of FIG. 4A, an example mode of a method of operating adaptor 20 and its processor 60 more particularly comprises the basic acts or steps 3-1, 3-2, and 3-3. Act 3-1 comprises receiving at adaptor first port 24 of the communications adaptor 20 a setup request signal (S-3-1) for an incoming communication carried over analog communications line 30 via POTS 35 from public switched telephony network (PSTN) 36. As part of act 3-1 the processor 60 determines that a first call setup request signal has been received at the adaptor first port. Then, subsequent to such determination, processor 60 performs acts 3-2 and 3-3.

Act 3-2 comprises transmitting a second call setup request signal (S-3-2) over the adaptor second port 26 to Internet Protocol (IP) telephony system 40 over the data network 34. For example, as act 3-2 the processor 60 may generate a digital setup request signal (S-3-2) for a data connection when the setup request signal for the incoming communication is received over the analog communications line 30. The digital setup request signal of act 3-2 is generated by processor 60 for transmission to Internet Protocol (IP) telephony system 40 over data network 34 connected to adaptor second port 26 of the communications adaptor. As explained herein, in an example implementation the setup request signal (S-3-2) may take the form of a Session Initiation Protocol (SIP) INVITE message. See, e.g., Internet Engineering Task Force, RFC 3261, "SIP: Session Initiation Protocol", June 2002, which is incorporated herein by reference in its entirety.

The data connection for which the digital setup request signal (S-3-2) is generated by adaptor 20 is not a mere forwarding of the setup request signal (S-3-1) for an incoming PSTN call. Rather, the digital setup request signal (S-3-2) is generated as a new connection request which may reflect some of the parameters of the incoming PSTN call, such as, e.g., caller ID of the PSTN caller. In other words, the digital setup request signal (S-3-2) initiates a new connection which is different from the incoming PSTN call while using signaling information based on the incoming PSTN call (e.g., of the setup request signal (S-3-1)).

Act 3-3 comprises transmitting a third call setup request signal (S-3-3) over the adaptor third port 28. For example, the processor may be configured to generate for the third call setup signal (S-3-3) an analog setup request signal for transmission to adaptor third port 28, e.g., to analog telephony device 32. Thus in this FIG. 1A/FIG. 3A/FIG. 4A implementation the method of operating the processor 60 further comprises act 3-3 shown in FIG. 3A, e.g., upon receipt of the setup request signal (S-3-1) for the incoming analog (PSTN) call, generating an analog setup request signal (S-3-3) for transmission to adaptor third port 28, e.g., to analog telephony device 32.

In one example implementation, the act 3-3 of generating the analog setup request signal may comprise converting the digital setup request signal (S-3-2) from digital to analog form. The act of processor 60 "converting" the digital setup request signal (S-3-2) for the incoming (PSTN) call does not mean that converted signal S-3-3 is essentially a passthrough of setup request signal (S-3-1). Rather, since processor 60 is a digital device, the processor 60 preferably converts the digital setup request signal (S-3-2) from analog form to digital form. The processor 60 converts the digital setup request signal (S-3-2) to analog form to output the converted signal S-3-3 to adaptor third port 28.

The timing of the transmission of the generation of the analog setup request signal S-3-3 may be selectively controlled by processor 60. In one example implementation the processor 60 may be configured to generate and transmit the analog setup request signal S-3-3 to the adaptor third port essentially immediately after the analog setup request signal S-3-1 is received. For example, the digital setup request signal (S-3-2) and the analog setup request signal S-3-3 may be transmitted essentially in parallel. That is, the digital setup request signal (S-3-2) and the analog setup request signal S-3-3 may be transmitted essentially. In this "parallel" example implementation a sequence of events such as those shown in Table 1 may occur. In Table 1 and otherwise herein, "FXO" refers to adaptor first port 24 and "FXS" refers to adaptor third port 28. All of the interactions/occurrences of Table 1 are controlled by processor 60.

TABLE 1

Incoming ring detection on FXO -> Ring generation on FXS
Incoming caller ID on FXO -> Caller ID generation on FXS
User goes off-hook on FXS -> FXO port goes off-hook signaling to the PSTN that the call is answered
Audio path is established bidirectionally between FXS & FXO ports as follows:
FXO -> A/D -> D/A -> FXS
FXS -> A/D -> D/A -> FXO
User goes on-hook on FXS -> FXO port goes on-hoo ksignaling to the PSTN that the call is terminated
Audio path is torn down In another example implementation the processor 60 may be configured to generate and transmit the analog setup request signal S-3-3 to adaptor third port 28 at a time delay after generation of the setup request signal (S-3-2). In such delayed implementation the time delay may be configured to allow the Internet Protocol (IP) telephony system 40 sufficient time to perform a call enhancement service, as herein described. The duration of the time delay may be determined by processor 60, or by IP telephony system 40. In the latter regard, the processor 60 may be dependent upon signaling from IP telephony system 40 for advising the processor 60 when to send the analog setup request signal S-3-3 to adaptor third port 28.

In an example embodiment described herein, the analog setup request signal (S-3-3) may be generated upon receipt of an IP-formatted setup request signal received from IP telephony system 40. The IP-formatted setup request signal received from IP telephony system 40 may also be referred to as a fourth setup request signal. For example, the processor may be configured to convert the IP formatted setup request signal to the analog setup request signal (S-3-3).

Upon receipt of the digital setup request signal (S-3-2) at the IP telephony system 40, the call setup function 42 consults at least telephony device register 43 to determine to which telephony devices, e.g., to which extension telephony device(s) 45, a further setup request signal is to be transmitted for the customer who is being called by the incoming PSTN call. Assuming that the telephony device register 43 indicates that extension telephony device 45 is such a registered device designated to receive an incoming call for the customer, the call setup function 42 sends a further setup request signal (S-3-4) to the extension telephony device 45 as shown in FIG. 1A and FIG. 4A. Like the setup request signal (S-3-2), the further setup request signal (S-3-4) is an IP-formatted setup request signal, but has routing and address information modified so that the further setup request signal (S-3-4) will reach the extension telephony device 45. The further call setup signal also may include caller ID information of the calling party.

Thus, in the example embodiment of FIG. 3A, the analog setup request signal S-3-3 is sent by processor 60 to adaptor third port 28 independently of IP telephony system 40, e.g., without having to receive an IP-formatted signal from IP telephony system 40 that is sent to one or more extension telephony devices. Thus, in view of the independent nature of the analog setup request signal S-3-3, it is possible that the analog telephony device 32 may answer the call or go "off hook". Should the analog telephony device 32 answer the call, the "off hook" signal from analog telephony device 32 is sent to processor 60. In accordance with the off hook condition indication processor 60 sends another signal over the data network 34 to IP telephony system 40 to cancel the digital setup request signal over the data network, e.g., to stop the "ringing" at other extension telephony devices. However, in an example implementation, the processor 60 is further configured in accordance with the off hook condition indication to generate a notification signal to the IP telephony system with information to enable the IP telephony system to make a record of the incoming communication. That is, the IP telephony system 40 may include the incoming communication, answered by analog telephony device 32, in a log of communications for the customer's account.

Figure 1B:
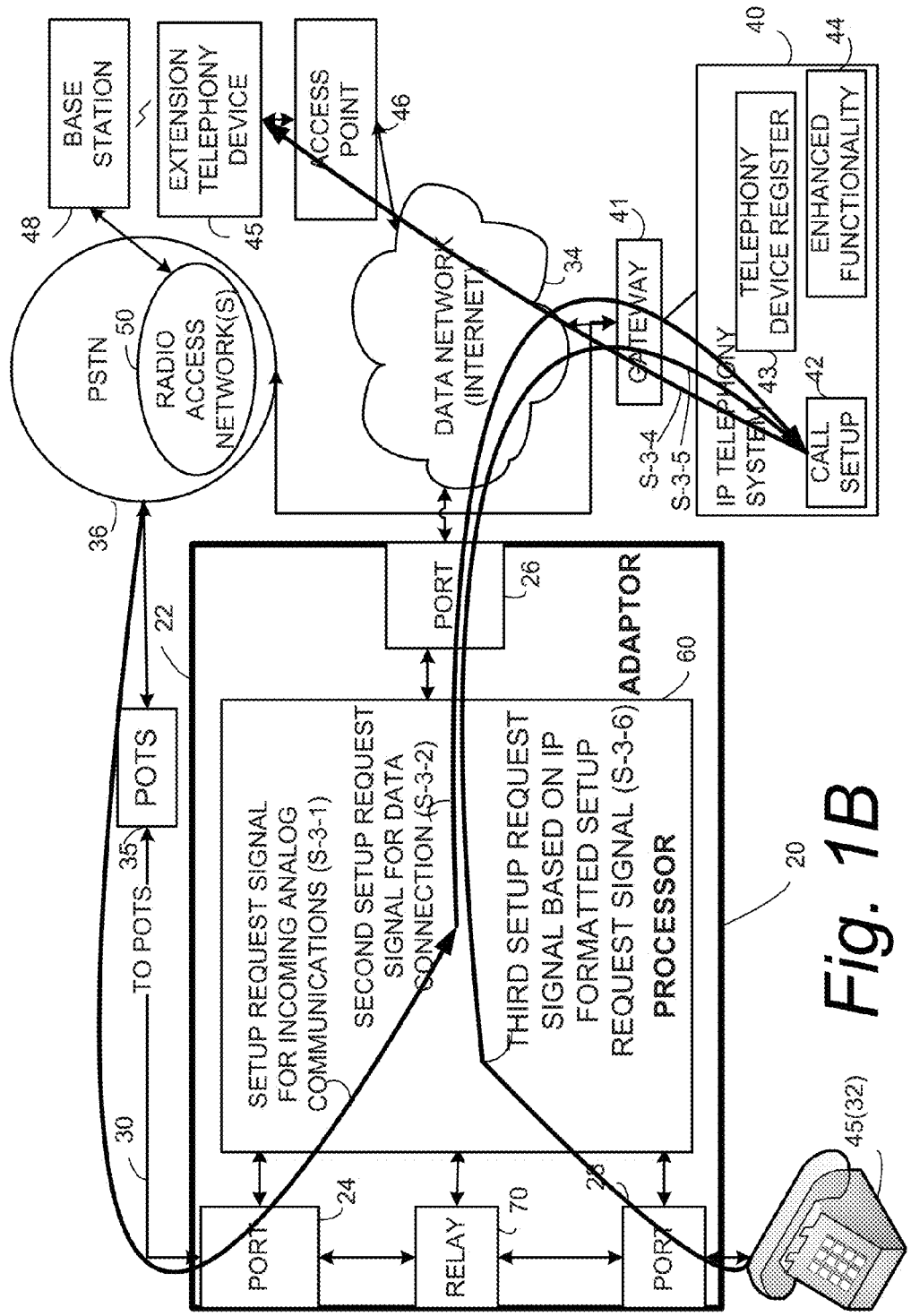
FIG. 1B is a diagrammatic view of the telephony communications adaptor performing certain further and optional acts in accordance with an example IP network controlled mode.
Figure 3B:
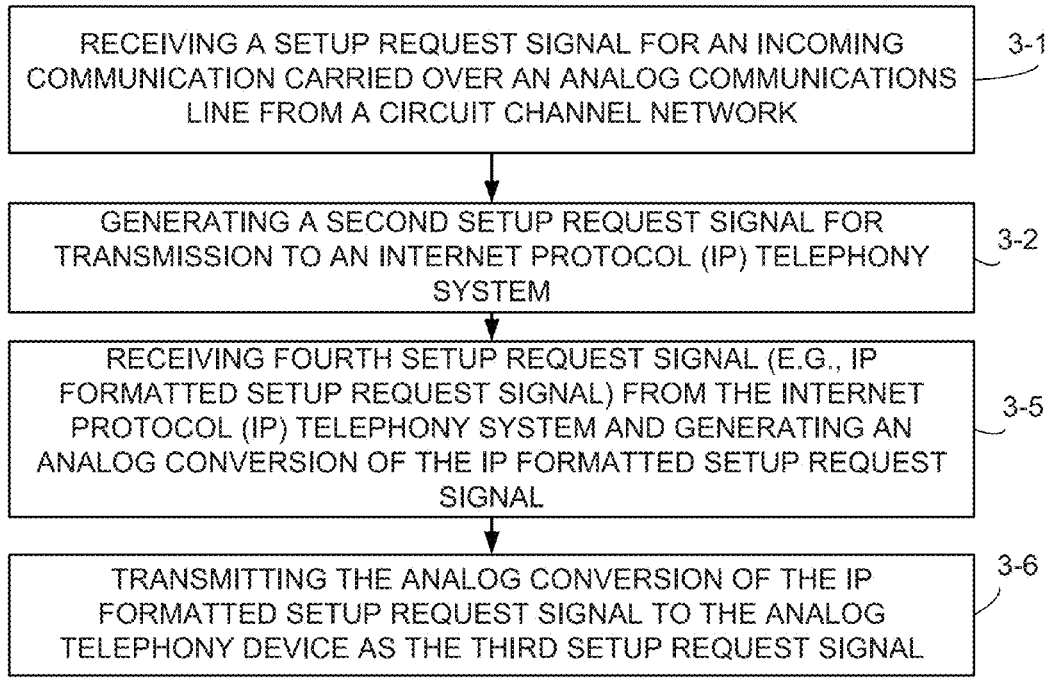
FIG. 3B is a flowchart showing example, representative acts or steps performed by a communications adaptor according to the example IP network controlled mode of FIG. 1B.

In another example implementation illustrated in FIG. 1B, the flowchart of FIG. 3B, and the signaling diagram of FIG. 4B, the analog telephony device is considered one of the extension telephony devices 45 which is contacted by IP telephony system 40 in accordance with call setup and, in some implementations, other logic of IP telephony system 40. Thus, in FIG. 1B the analog telephony device is shown as analog telephony device 45 (32), e.g., an "extension" analog telephony device. In the embodiment of FIG. 1B FIG. 3B, and FIG. 4B, the analog telephony device 45 (32) is one of the extension telephony devices which is registered in telephony device register 43.

The method of operating the processor 60 of adaptor 20 in the embodiment of FIG. 1B, FIG. 3B, and FIG. 4B thus involves an act 3-5. Act 3-5 comprises receiving an IP-formatted setup request signal from IP telephony system 40 (shown as signal S-3-5 in FIG. 1B and FIG. 4B) and generating the analog setup request signal based on the IP formatted setup request signal. For example, the analog setup request signal (S-3-6) of FIG. 3B may be an analog conversion of the IP-formatted setup request signal (S-3-5) Act 3-6 comprises the processor 60 sending the analog setup request signal based on the IP formatted setup request signal (illustrated as signal S-3-6 in FIG. 1B and FIG. 4B) to adaptor third port 28, and thus to analog telephony device 45 (32).

Figure 1C:
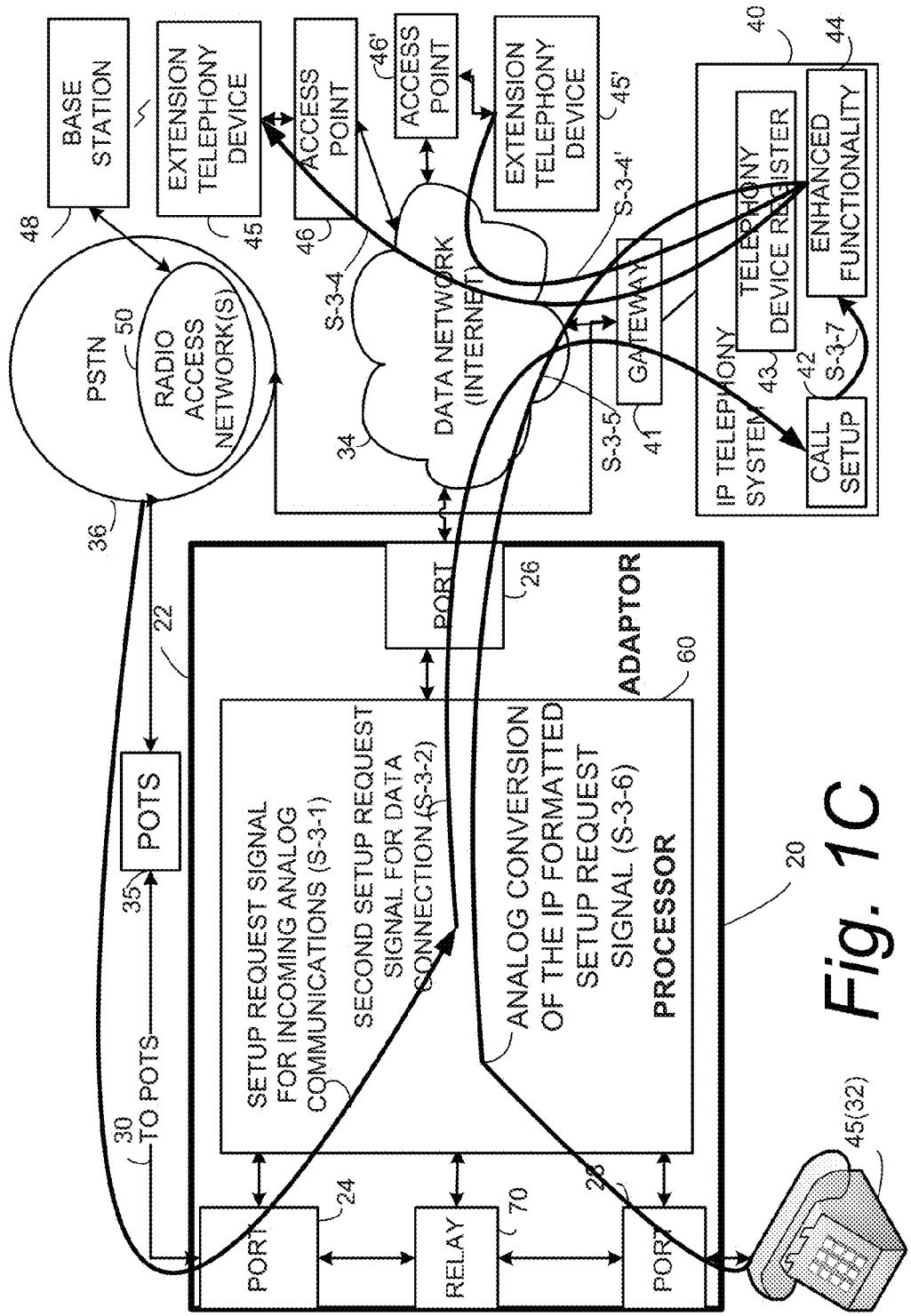
FIG. 1C is a diagrammatic view of the telephony communications adaptor performing certain further and optional acts in accordance with an example enhanced service mode.

FIG. 1C and FIG. 4C(1)-FIG. 4C(4) show other example embodiments and modes which implement variations of the embodiment of FIG. 1B, FIG. 3B, and FIG. 4B. In the example embodiments of FIGS. 1C and 4D(1)-FIG. 4C(4) the IP telephony system 40 invokes enhanced service function 44 (also known as call enhancement function) in conjunction with its transmission of IP-formatted further setup request messages to one or more extension telephony devices. The call enhancement service function 44 may affect how the IP-formatted setup request signal is sent to at least one extension telephony device, e.g., in what order IP-formatted setup request signaling is sent to the extension telephony device(s). The enhanced service function 44 may comprise, for example, services such as call forwarding, simultaneous ring, sequential ring, or call blocking. For the purpose of illustrating various examples of enhanced service function 44, FIG. 1C and FIG. 4C(1)-FIG. 4C(4) show further telephony devices. In particular, FIG. 4C(1) shows a further telephony device 45' which is not registered with the call-receiving customer's account in telephony device register 43, but is registered with IP telephony system 40 (e.g., perhaps in association with another customer account). In FIG. 4C(3)-FIG. 4C(4) the further telephony device 45' may be a further extension telephony device which is registered (along with extension telephony device 45 and analog telephony device 45 (32)) with the call-receiving customer's account in telephony device register 43. FIG. 1C and FIG. 4C(1)-FIG. 4C(4) show telephony device 45' as being connected via access point 46'.

FIG. 1C shows as act 3-7 the call setup function 42 invoking enhanced service function 44, which in turn may invoke telephony device register 43 in order to determine which telephony devices are to be involved in the enhanced service function. The further acts performed depend on whether the enhanced service function 44 is the service of call forwarding (shown in FIG. 4C(1)), simultaneous ring (shown in FIG. 4C(3)), or sequential ring (shown in FIG. 4C(4)).

FIG. 4C(1) shows implementation of a call forwarding service in which the communication inbound from public switched telephony network (PSTN) 36 (as reflected by signal S-3-1) is forwarded to telephony device 45' which is associated with another called party number. That another called party number may or may not be registered with IP telephony system 40. Therefore, FIG. 4C(1) shows the IP telephony system 40 performing the enhanced service function 44 by sending the further call setup request signal S-3-7-1i to a telephony device 45' which is registered with IP telephony system 40. On the other hand, for an alternative case, FIG. 4C(2) shows the IP telephony system 40 performing the enhanced service function 44 by sending the further call setup request signal S-3-7-1p to a telephony device 45' which is not registered with IP telephony system 40. For the telephony device 45' which is not registered with IP telephony system 40 the IP-formatted further call setup request signal S-3-7-1p is sent to processor 60 of adaptor 20, which converts the further call setup request signal S-3-7-1p to analog for sending to public switched telephony network (PSTN) 36. The public switched telephony network (PSTN) 36 may then route the call to unregistered telephony device 45'. A similar result may be achieved by the IP telephony system 40 forwarding the call through a PSTN gateway, with a difference being that upon routing through the adaptor the PSTN number will be presented as the calling party ID rather than the original caller's ID.

FIG. 4C(3) shows implementation of a simultaneous ring service which is performed by enhanced service function 44 of IP telephony system 40 for the communication inbound from public switched telephony network (PSTN) 36 (as reflected by signal S-3-1). In performing the simultaneous ring service the IP telephony system 40 essentially simultaneously sends further call setup request signals to each of the telephony devices which are registered for the call-receiving customer in telephony device register 43. FIG. 4C(3) thus shows IP telephony system 40 as sending the further call setup request signal S-3-4 to extension telephony device 45, a further call setup request signal S-3-4' to extension telephony device 45', and the IP-formatted setup request signal S-3-5 to adaptor 20. The further call setup request signal S-3-4 and the further call setup request signal S-3-4' are both understood with respect to act 3-4 as above described in conjunction with, e.g., FIG. 4A. As previously described, the IP-formatted setup request signal S-3-5 subsequently results in the processor 60 generating the analog setup request signal based on the IP formatted setup request signal (illustrated as signal S-3-6 in FIG. 4C(3)) and sending the analog signal S-3-6 to adaptor third port 28, and thus to analog telephony device 45 (32). Thus, in the example embodiment of FIG. 4C(3), all registered telephony devices essentially are "rung" at the same time.

FIG. 4C(4) shows implementation of a sequential ring service which is performed by enhanced service function 44 of IP telephony system 40 for the communication inbound from public switched telephony network (PSTN) 36 (as reflected by signal S-3-1). In performing the sequential ring service the IP telephony system 40 essentially sends further call setup request signals, one at a time in a predefined sequence, to the telephony devices which are registered for the call-receiving customer in telephony device register 43. For the particular example shown in FIG. 4C(4), the enhanced service function 44 is preconfigured to first contact extension telephony device 45, and if extension telephony device 45 does not answer within a predefined time interval, to secondly contact extension telephony device 45'. If extension telephony device 45' does not answer within a predefined time interval, the enhanced service function 44 is configured to contact analog telephony device 45 (32). Accordingly, FIG. 4C(4) shows by arrow T1 a first predetermined time interval (following transmission of the further call setup request signal S-3-4 to extension telephony device 45). If time interval T1 elapses with no answer by extension telephony device 45 a further call setup request signal S-3-4' is sent to extension telephony device 45'. Likewise, FIG. 4C(4) shows by arrow T2 a second predetermined time interval (following transmission of the further call setup request signal S-3-4' to extension telephony device 45). If time interval T2 elapses with no answer by extension telephony device 45' an IP-formatted setup request signal S-3-5 is sent to adaptor 20. Of course, if any prioritized telephony device answers, there is no need to contact any other telephony device registered in the sequential ring list.

The enhanced service function 44 of call blocking is not separately illustrated, it being understood that no further call setup request signals are transmitted to any telephony device in conjunction with a call blocking service.

Thus, by sending the digital call request signal S-3-2 to IP telephony system 40 upon receipt of a call request signal S-3-1 from public switched telephony network (PSTN) 36, the adaptor 20 is able to invoke services of IP telephony system 40 which otherwise would not be available had the adaptor 20 simply routed the call to analog telephony device 32, e.g., call enhancement services. Moreover, in being able to also send an analog setup request signal to the analog telephony device 32, the analog telephony device 32 is able to participate in the call enhancement services, in manner controlled by the IP telephony system 40. Example such services include those enhanced services described above, e.g., call forwarding (shown in FIG. 4C(1)), simultaneous ring (shown in FIG. 4C(3)), sequential ring (shown in FIG. 4C(4)), and call blocking, among others. A non-exhaustive list of other call enhancement services may include those listed in Table 2.

TABLE 2

Other Examples of Call Enhancement Services

Caller reaches an interactive voice response (IVR) through which the caller may select an extension to which the call is to be directed.
For anonymous callers, the caller is asked to identify himself before the call is directed to one or more extensions. When the call is answered, the caller's identity is played back and the customer is given an option to accept or reject the call.
Callers are selectively blocked based on numbers entered by the customer in a blocked call list.
Day/Time based rules - set different call forward or simultaneous/sequential ring rules based on time of day & day of week If the customer associated adaptor 20 were to receive a second incoming call after receipt of a first call, the adaptor 20 generates a second request setup message for transmission to IP telephony system 40 for the second incoming call. For example, in an example embodiment in which the signaling implemented by adaptor 20 is SIP signaling, receipt of a second request setup message may result in generation of a second SIP INVITE message, which is a separate message from the first SIP INVITE message and which sets up a separate session than the first SIP INVITE message. Like the first SIP INVITE message, the second SIP INVITE message may bear the caller identifiers (IDs) of the respective calling party, so that the customer may determine whether the customer wants to answer the second incoming call and place the first call on hold. If the customer wants to accept the second incoming call, using the telephony device in which the customer is already participating in the first call the customer puts the first call on hold and accepts the second incoming call. A "flash-hook" is sent from the FXO port, e.g., adaptor first port 24, which tells the public switched telephony network (PSTN) 36 to switch from the first call to the second call. Later, should the customer want to go back to the first call, the customer puts the second call on hold. This results in a flash-hook to be sent from the FXO port to the PSTN 36 telling the PSTN 36 to switch from the second to the first call.

As mentioned above, in some example embodiments and modes the digital call setup request signal which is sent over the data network 34 to IP telephony system 40 may be Session Initiation Protocol (SIP) INVITE message. Likewise, the further call setup request signals (such as signals S-3-4 and S-3-4') sent by IP telephony system 40 to telephony devices (such as extension telephony device 45) and the IP-formatted setup request signal S-3-5 sent from IP telephony system 40 to adaptor 20 may also be Session Initiation Protocol (SIP) INVITE messages. Of course, the different SIP INVITE messages have different headers in accordance with the different source (e.g., transmitting) address and destination address of the respective messages. Furthermore, as an optional feature, either in the INVITE message or other message the processor 60 of adaptor 20 may be further configured to provide the IP telephony system 40 with an account identifier of a subscriber associated with the communications adaptor 20. In other example embodiments, processor 60 does not necessarily need to provide the account identifier, since the SIP "From" field will uniquely identify the identity of the adaptor first port (FXO) 24, which can be cross-referenced to the subscriber's account identifier by the IP telephony system. In at least some example embodiments described herein the adaptor 20 has the ability to send the caller ID information for the calling party on the call setup request message to IP telephony system 40.

The setup request messages described herein and the signaling implemented by adaptor 20 need not necessarily be SIP signaling. Other signaling protocols may be employed, such as H.323, XMPP, and other websocket types of protocols.

In the foregoing embodiments, whenever a telephony device answers the incoming call from the public switched telephony network (PSTN) 36, a response message is sent to public switched telephony network (PSTN) 36 through adaptor 20 and through adaptor first port 24 in particular. Thereafter the PSTN calling party hears the audio from the called party. In historical telephony parlance when an incoming call is answered by a telephony device, the telephony device is said to go or be "off hook". Such is the case even though modern telephony devices may not have the hook feature of old time dial telephones. In embodiments in which the SIP protocol is used for signaling, when one of the extensions answers the call, that the answering device will send a SIP 200 OK which then is converted to an off-hook on the FXO port, e.g., adaptor first port 24.

In a situation in which the IP telephony system 40 contacts plural telephony devices in conjunction with setup of an incoming call, when the call is answered by the first-to-answer telephony device a cancellation signal is sent to the other telephony devices. For example, in a simultaneous ring scenario such as shown in FIG. 4C(3) all non-answering telephony devices are sent a cancellation signal after the first-to-answer telephony device goes off hook. In the sequential ring scenario of FIG. 4C(4) the answering of the incoming call by any telephony device on the sequential ring list results in the lower priority devices not even receiving a call setup message if a higher priority device answers the call. If the higher priority device does not answer within a defined interval, then a cancellation signal is sent to the higher priority device to make it stop ringing, and a call setup message is sent to the next lower priority device to make it start ringing. This process continues until all devices in the sequential ring list are covered.

Figure 5:
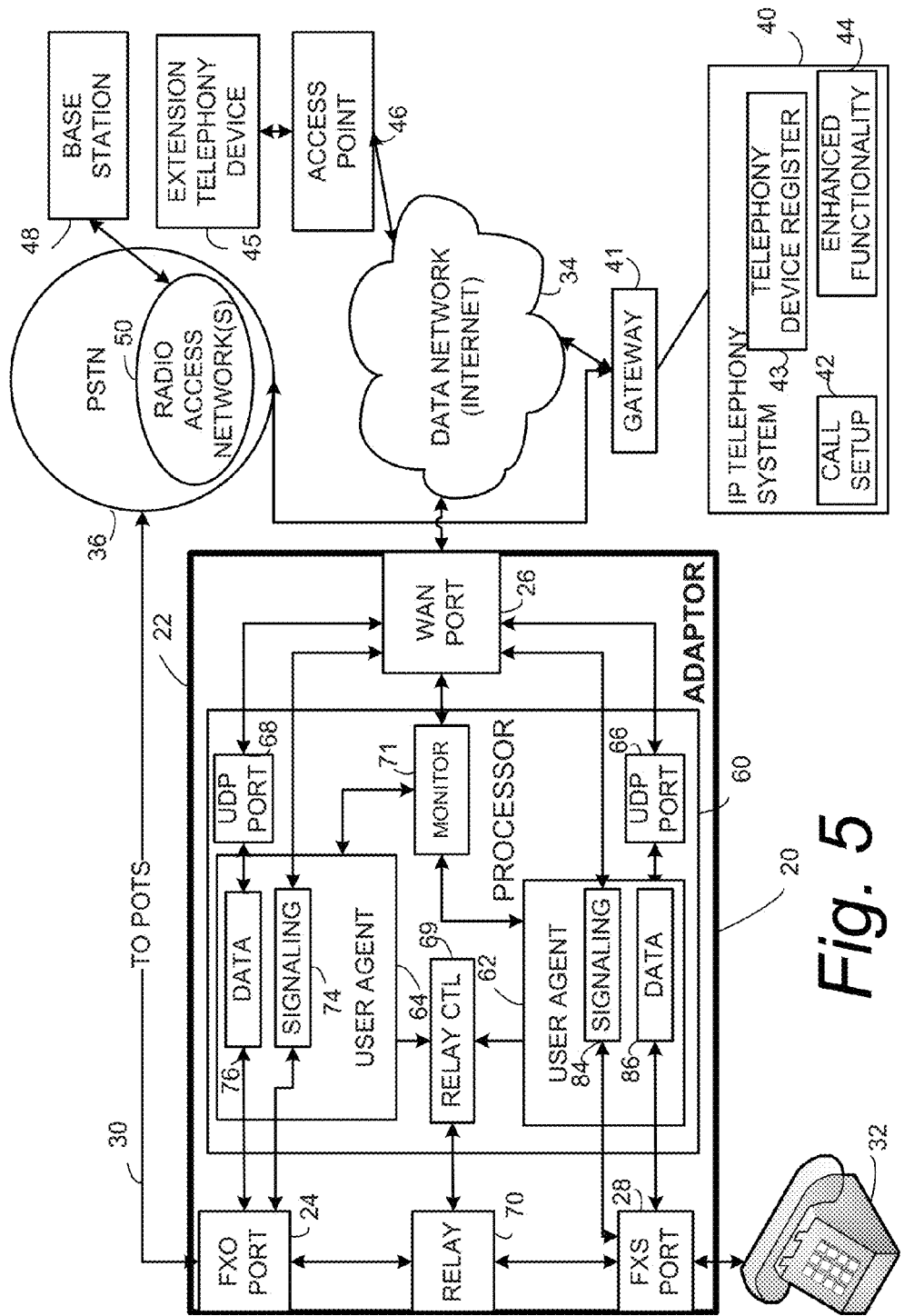
FIG. 5 is a diagrammatic more detailed view of a telephony communications adaptor associated with an Internet Protocol (IP) telephony system in accordance with an example embodiment.

More detailed operation of an example embodiment of adaptor 20 is described with reference to FIG. 5. As shown in FIG. 5, processor 60 comprises user agent logic in the form of user agent 62 (also known as user server 62) and user agent 64 (also known as user client 64); plural User Datagram Protocol (UDP) ports, including UDP ports 66 and 68; and relay controller 69. User Datagram Protocol (UDP) is a connectionless oriented protocol that uses an IP address for the destination host and a port number to identify the destination application. A UDP port number is distinct from any physical port on a computer such as a COM port or an I/O port address. The UDP port typically is a 16-bit address that exists for the purpose of passing certain types of datagram information to the correct location above a transport layer of a protocol stack. Audio for voice over IP calls is typically carried in Real Time Protocol (RTP) packets which are encapsulated in the UDP payload. In the particular implementation shown in FIG. 5 UDP port 66 is associated with user agent 64 and port 26 while UDP port 68 is associated with user agent 64 and adaptor second port 26. The relay controller 69 is associated with a relay switch 70.

FIG. 5 thus shows user agent logic as comprising user agent 64 which handles calls or communications outgoing from adaptor 20 toward IP telephony system 40. The user agent 64 comprises signaling client 74 and signaling data client 76. FIG. 5 further shows that user agent logic also comprises user agent 62 which handles calls or communications which are incoming to adaptor 20 from IP telephony system 40. The user agent 62 comprises signaling client 84 and data client 86. As indicated previously, one type of signaling that may be utilized by adaptor 20 is Session Initiation Protocol (SIP), and accordingly in one example embodiment the user agent logic comprises SIP logic, with the user agent 64 being a SIP client and the user agent 62 being a SIP server.

FIG. 5 and the foregoing description of adaptor 20 provides further insight as to how, in an example embodiment and mode, the adaptor 20 may communicate with public switched telephony network (PSTN) 36, with analog telephony device 32, and with IP telephony system 40. In particular, the adaptor 20 is provided with or assigned an Internet Address (e.g., adaptor IP address) that corresponds to adaptor second port 26. In communicating with IP telephony system 40 the adaptor 20 uses its adaptor IP address as a source address when sending packets to IP telephony system 40, and conversely the adaptor IP address is used by IP telephony system 40 as a destination address for packets intended for adaptor 20, e.g., packets which form signaling or data which needs to be converted for use in communicating with public switched telephony network (PSTN) 36 or analog telephony device 32.

FIG. 5 also shows that the User Datagram Protocol (UDP) ports are also used for providing further specificity as to whether a packet is included in a communication with analog telephony device 32 or with public switched telephony network (PSTN) 36. In this regard, if the IP telephony system 40 intends to send a message (such as a 200 OK message) to the POTS calling party, the IP telephony system 40 specifies in the 200 OK message both the adaptor IP address and the identifier of the UDP port (e.g., UDP port 68) which is associated with public switched telephony network (PSTN) 36. On the other hand, if the IP telephony system 40 intends to send a message to the analog telephony device 32, the IP telephony system 40 specifies in the message both the adaptor IP address and the identifier of the UDP port (e.g., UDP port 66) which is associated with 32. The adaptor IP address and the identifier of the UDP port are in the body of the message. For example, in SIP protocol the adaptor IP address and the identifier of the UDP port may be in a section of the 200 OK message referred to as session description protocol (SDP). When using non-SIP protocols the adaptor IP address and the identifier of the UDP port may be included in other types of messages.

In other words, the message directed towards public switched telephony network (PSTN) 36 includes (adaptor IP address, port 68). On the other hand, if the IP telephony system 40 intends to send a message to analog telephony device 32, the IP telephony system 40 includes in the message both the adaptor IP address and the identifier of the UDP port associated with analog telephony device 32, e.g., (adaptor IP address, port 66). In similar way, using the UDP port numbers, the processor 60 handles packets received from IP telephony system 40, whether signaling (of any type of message) or (user) data.

The FIG. 5 representation of adaptor 20 also illustrates that both user agent 64 and user agent 62 include functionalities for separately handling signaling and user data. For signaling outgoing from adaptor 20, signaling client 74 generates new data messages based on information included in the circuit switched messages received at adaptor first port 24 from the public switched telephony network (PSTN) 36, and sends those new signaling messages to the IP address of IP telephony system 40. Likewise, after the call or communication is set up, the analog content (e.g., voice) received from public switched telephony network (PSTN) 36 is converted to packets by data client 76, and such data packets are sent to UDP port 68 for transmission to the IP address for IP telephony system 40. For signaling incoming from IP telephony system 40 when there is a call to public switched telephony network (PSTN), the signaling client 74 generates, from the incoming IP-formatted signaling, new analog signaling that is applied to adaptor first port 24. For signaling incoming from IP telephony system 40 when there is a call to analog telephony device 32, signaling client 84 generates, from the incoming IP-formatted signaling, new analog signaling that is applied to adaptor third port 28. After the call or communication is set up, the packet-carried digital content (e.g., voice or media) received from IP telephony system 40 is converted from digital to analog by data client 76 and/or data client 86. Such analog signal is sent by data client 76 to the first adapter port 24 (when there is a call to/from public switched telephony network (PSTN) 36), or the analog signal is sent by data client 86 to adaptor third port 28 when analog telephony device 32 participates in a call or communication.

It will be appreciated by those skilled in Internet technology that packets exchanged between adaptor 20 and IP telephony system 40, while transmitted between respective internet addresses for adaptor 20 and IP telephony system 40, may travel different paths through data network 34. Indeed, for the same call or communication the signaling in which either signaling client 74 or signaling client 84 participates with IP telephony system 40 may travel a different path than the data packets with which data client 76 and data client 86 participate with IP telephony system 40.

Figure 6:
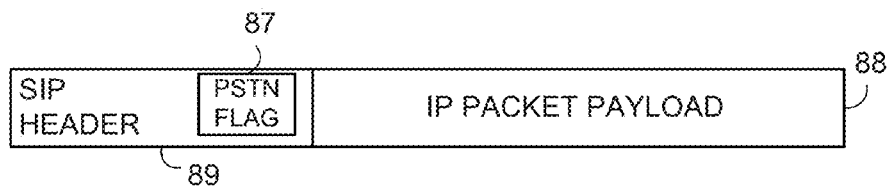
FIG. 6 is a diagrammatic view showing an indication of PSTN involvement in the form of a PSTN flag in a header of an outgoing IP packet.

As explained above, the adaptor 20 (and signaling client 74 in particular) may generate an outgoing signal for transmission to IP telephony system 40, and such outgoing signal may result from receipt of an analog signal on line 30 from public switched telephony network (PSTN) 36. In an example embodiment and mode the signaling client 74 may include in the outgoing signal to IP telephony system 40 an indication that the outgoing signal was prompted by or occurs in conjunction with a communication involving the public switched telephony network (PSTN) 36 (e.g., either the calling party or the called party may participating in the call or communication using resources of the public switched telephony network (PSTN) 36). As shown in FIG. 6, such indication of PSTN involvement, e.g., a PSTN flag 87, may comprise one or more bits, or a field, in the outgoing IP packet 88. Preferably the PSTN flag is included in a header of a signaling packet (e.g., part of an SIP packet 89) of the outgoing IP packet. Although the PSTN flag 87 may occupy any appropriate location in the outgoing IP packet, in some example implementations the PSTN flag is considered a custom parameter and is added towards the end of a header of the signaling (SIP) packet.

The IP telephony system 40 may be configured to detect the PSTN flag 87 and take an appropriate action, such as an action that occurs or is desired as a result of the receipt of a PSTN signal and/or handling of an incoming call originated from public switched telephony network (PSTN) 36. For example, the IP telephony system 40 may accumulate statistics, or enable another node to accumulate and analyze statistics, pertaining to the origination sources of calls or communications handled by IP telephony system 40. Alternatively, the IP telephony system 40 may assess a different tariff or fee for communications or calls that involve (e.g., are originated at) public switched telephony network (PSTN) 36 as opposed to communications or calls generated by an IP telephony system or service.

Figure 2:
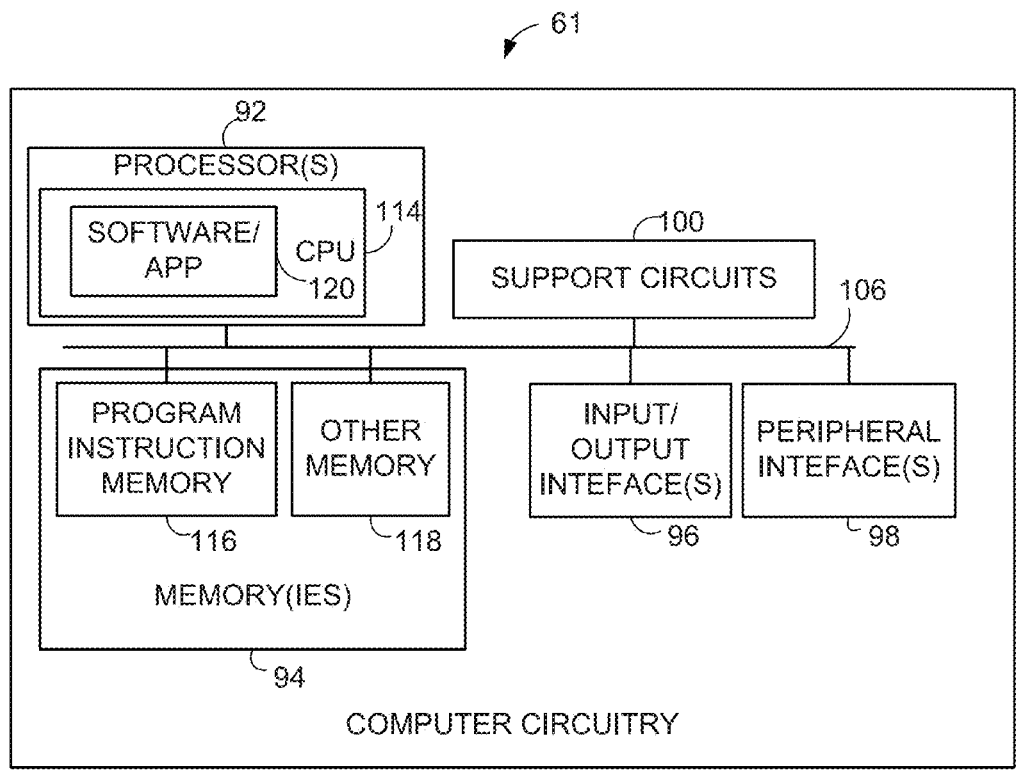
FIG. 2 is a diagrammatic view of various elements of computer circuitry that may comprise either an IP telephony system or a telephony communications adaptor in accordance with example embodiments.

It will be appreciated that the tracking or monitoring of PSTN-flagged calls (e.g., calls in which public switched telephony network (PSTN) 36 participates, either in origination of the call or otherwise) may be implemented by a processor, controller of a computer circuit, such as the computer circuit 61 of FIG. 2. Indeed other functionalities of IP telephony system 40 as wherein described, such as call setup function 42, telephony device register 43, and enhanced service function 44, may be implemented by one or more such computer circuits 61. The computer circuitry 61 may be implemented at one or more servers, at one or more nodes of IP telephony system 40, and in some cases may also involve equipment external to IP telephony system 40.

The adaptor 20 not only handles incoming calls, e.g., calls incoming on line 30 from public switched telephony network (PSTN) 36 and calls originated or conveyed via IP telephony system 40, but also calls outgoing from analog telephony device 32. In other words, the calls placed by analog telephony device 32 when the calling party uses analog telephony device 32 are also handled by adaptor 20. In this regard, the processor 60 of adaptor 20 may execute predefined logic for the handling of an outgoing call initiated by analog telephony device 32. That predefined logic executed by processor 60 may either be programmed at processor 60, or downloaded to processor 60 from IP telephony system 40, for example. The analog signaling for all calls initiated by analog telephony device 32 is transmitted through adaptor third port 28 to UDP port 68, and new SIP INVITE is generated when the user goes off-hook and dials a number.

In one predefined outgoing call protocol the processor 60 may route all but certain excepted outgoing calls to IP telephony system 40 rather than to public switched telephony network (PSTN) 36. In other words, the processor 60 may be configured by default to connect the adaptor third port 28 to the adaptor second port 26 when the analog telephone device initiates 32 an outbound communication, unless the processor receives a default override indication. The excepted outgoing calls that are routed to public switched telephony network (PSTN) 36 rather than to IP telephony system 40 may include emergency (e.g., E911) calls or calls that include an override indication, e.g., are begun with a certain prefix (e.g., *55). For the non-excepted calls which are to be transmitted to IP telephony system 40, the digitally-formatted signaling is routed using UDP port 66 and adaptor second port 26 and via data network 34 to IP telephony system 40. For the excepted calls which are to be transmitted to public switched telephony network (PSTN) 36, the digitally-formatted signaling is converted to analog signaling (e.g., by incoming signaling client 84) and routed through adaptor first port 24 to public switched telephony network (PSTN) 36. Media going between adaptor first port 24 and adaptor third port 28 does not use UDP ports, but rather media frames are directly transferred between the ports within the processor. This occurs in a similar manner as the acts described in Table 2 as discussed above.

Another predefined outgoing call protocol may be the exact opposite for the foregoing. Or as a variation of the foregoing emergency calls may be routed to IP telephony system 40. The customer and/or IP telephony system 40 thus has flexibility in implementing an outgoing call protocol for calls outgoing from analog telephony device 32.

Even for outgoing calls from analog telephony device 32 for which a call setup request message is not sent to IP telephony system 40, the processor 60 may be configured to generate a notification signal or to the IP telephony system 40 with information to enable the IP telephony system 40 to make a record of the outbound communication, e.g., in conjunction with the customer's account.

In an example embodiment and mode adaptor 20 monitors the viability or availability of data network 34 and/or the connection of adaptor 20 to data network 34. In this regard adaptor 20 and processor 60 in particular is provided with network monitor 71 as shown in FIG. 5.

Should the network monitor 71 determine that adaptor second port 26 has lost connection to data network 34, e.g., determine that the data network 34 is unavailable, the network monitor 71 directs that processor 60 handle all subsequent incoming PSTN calls as analog calls routed to the analog telephony device and all outgoing calls from analog telephony device 32 be handled as analog calls routed to the PSTN. Simply speaking, when the data network 34 is unavailable the processor 60 routes communications between the adaptor first port 24 and the adaptor third port 28. More specifically, after network monitor 71 determines that the adaptor's 20 connection to data network 34 has been lost (e.g., is unavailable), for an incoming PSTN call on analog communications line 30 the processor 60 receives the analog call setup request signaling via adaptor first port 24, and sends an analog call setup request signal to analog telephony device 32 through adaptor third port 28. In so doing, the processor 60 first converts the analog call setup request signaling received from public switched telephony network (PSTN) 36 to digital form within processor 60, and then reconverts the digital form to analog form for application via adaptor third port 28 to analog telephony device 32. Since the network monitor 71 has determined that the connection to data network 34 has been lost, for this incoming PSTN call setup request signal the processor 60 does not create a new digital call setup request message for transmission to IP telephony system 40.

Similarly, after network monitor 71 determines that the adaptor's 20 connection to data network 34 has been lost or that the data network 34 is unavailable, for an outgoing call from analog telephony device 32 the processor 60 receives the call setup request signal from analog telephony device 32 through adaptor third port 28, and ultimately sends a call setup request signal to public switched telephony network (PSTN) 36 through adaptor first port 24. In so doing, the processor 60 first converts the analog call setup request signaling received from analog telephony device 32 to digital form within processor 60, and then reconverts the digital form to analog form for application via adaptor first port 24 to analog communications line 30. Thus, for such scenario the processor 60 does not generate a digital call setup request signal to IP telephony system 40.

The processor 60 may similarly route signaling and user data within processor between adaptor first port 24 and adaptor third port 28, e.g., between public switched telephony network (PSTN) 36 and analog telephony device 32, on other occasions as well. For example, the IP telephony system 40 may determine that the IP telephony system 40 should not be used for the customer, and IP telephony system 40 may send a signal to adaptor 20 to direct the processor 60 to route signaling and user data between adaptor first port 24 and adaptor third port 28 in the manner described above. As an example situation, if the service provider were offering the enhanced services as a priced option with an additional fee, and if the customer was not subscribed to this option, then there may be no need to field the call in the IP telephony system and tie up resources. Instead the system could direct that the call be handled locally in the adapter. It may just want to be notified of the call so that it can maintain proper records of all calls In the event that power is lost to the adaptor 20, the relay switch 70 closes, since it is a normally closed relay. With relay switch 70 closed, a bridge or direct relay is formed between adaptor first port 24 and adaptor third port 28 so that any signaling and user communication received at one port is directly communicated to the other port, without any involvement of processor 60 and thus no signaling sent to IP telephony system 40. When power is restored, and the adaptor resumes normal operation, the processor 60 opens the relay switch 70 via the relay control function.

FIG. 2 illustrates elements of machine hardware in the example form of computer circuitry 61 that may comprise adaptor 20 or IP telephony system 40. In the illustrated example embodiment, the machine hardware or computer circuitry 61 comprises a computer, e.g., computer equipment, but in other example embodiments the machine hardware may instead comprise or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

FIG. 2 shows an example of such machine hardware/computer circuitry 61 as comprising one or more processors 92; memory(ies) 94; input/output interfaces 96; peripheral interfaces 98; support circuits 100; and buss(es) 106 for communication between the aforementioned units.

Each adaptor 20 and IP telephony system 40 may include multiple processors 60/92, along with their operating components and programming, each carrying out a specific or dedicated function. The processor 60/92 shown in FIG. 2 may be one of any form of a general purpose computer processor used in accessing an IP-based network, such as a corporate intranet, the Internet or the like. The processor 92 comprises one or more central processing units (CPUs) 114.

The memory(ies) 94 may comprise memory such as program instruction memory 116 and other memory 118 (e.g., RAM, cache, etc.). The memory(ies) 94 may comprise computer-readable medium, and may be one or more of readily available memory such as random access memory (RAM), read only memory (ROM), floppy disk, hard disk, flash memory or any other form of digital storage, local or remote, and is preferably of non-volatile nature.

The support circuits 100 are coupled to the processor 60/92 for supporting the processor in a conventional manner. These circuits may include cache, power supplies, clock circuits, input/output circuitry and subsystems, and the like The input/output interfaces 96 serve to connect the processor 82 to possibly one or more input/output devices (not shown) for accessing the processor and/or performing ancillary or administrative functions related thereto.

The peripheral interfaces 98 may comprise circuitry and/or logic for other elements, such as other components of adaptor 20, e.g., adaptor first port 24, adaptor second port 26, and adaptor third port 28.

The buss(es) 106 may comprise plural or a single bus structure, with numerous buss configurations being possible without degrading or otherwise changing the intended operability of the processor 60/92.

One or more software routines or software programs are normally stored in program instruction memory 116. Some of the software routines or software programs may be referred to as "applications". FIG. 2 shows one such software routine or software program 120 as being loaded from program instruction memory 116 into CPU 114 so that the software program 120 is executed by processor 94. Execution of the software program 120 causes the processor 60/92 to perform processes of the disclosed embodiments. Also, the software routines could also be stored remotely from the CPU. For example, the software could be resident on servers and memory devices that are located remotely from the CPU, but which are accessible to the CPU via a data network connection.

Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 100 of the disclosed embodiments is capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. For the machine hardware of each processor such software may be stored on non-transient memory such as program instruction memory. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology disclosed herein provides many benefits and advantages, including a more seamless onboard experience. With installation of the adaptor 20 there is no need for a customer to cancel the existing POTS service, or move a telephone number over to a provider of internet telephony services. Moreover, the customer is also able to obtain advantage of enhanced services of an Internet Protocol telephony system for incoming POTS calls. Yet further, the adaptor 20 maintains access to public switched telephony network (PSTN) 36 when the broadband connection is not available.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A communications adaptor comprising:
   an adaptor first port configured to connect to an analog communications line;
   an adaptor second port configured to connect to a data network;
   an adaptor third port configured to connect to an analog telephony device;
   a processor configured to determine that a first call setup request signal has been received at the adaptor first port, and subsequent to such determination:
      transmit a second call setup request signal over the adaptor second port to an Internet Protocol (IP) telephony system over the data network;
      generate a third call setup request signal by converting the second call setup request signal from digital to analog format; and
      transmit the third call setup request signal over the adaptor third port.

2. The communications adaptor of claim 1, wherein the second call setup request signal includes an indication that the first call setup request was received at the adaptor first port.

3. The communications adaptor of claim 1, wherein the processor is further configured to provide the IP telephony system with an account identifier of a subscriber associated with the communications adaptor.

4. The communications adaptor of claim 1, wherein the processor is further configured to simultaneously transmit the third call setup request signal over the adaptor third port and transmit the second call setup request signal over the adaptor second port.

5. The communications adaptor of claim 1, wherein the processor is further configured to transmit the third setup request signal to the adaptor third port at a time delay after transmission of the second setup request signal to the Internet Protocol (IP) telephony system.

6. The communications adaptor of claim 1, wherein the processor is configured to generate the third setup request signal upon receipt of a fourth setup request signal received from the Internet Protocol (IP) telephony system.

7. The communications adaptor of claim 6, wherein the processor is configured to convert the fourth setup request signal to the third setup request signal.

8. The communications adaptor of claim 1, wherein the processor is further configured:
   to receive an off hook condition indication from the analog telephony device and;
   in accordance with the off hook condition indication to cancel the second setup request signal to the IP telephony system over the data network.

9. The communications adaptor of claim 8, wherein the processor is further configured in accordance with the off hook condition indication to generate a notification signal to the IP telephony system with information to enable the IP telephony system to make a record of the incoming communication.

10. The communications adaptor of claim 1, wherein the processor is further configured:
    to receive an off hook condition indication of an extension telephony device registered with the IP telephony system; and
    in accordance with the off hook condition indication to cancel the third setup request signal to the analog telephony device.

11. The communications adaptor of claim 1, wherein the processor is further configured:
    to make a determination regarding unavailability of the data network; and
    in accordance with the unavailability determination, to route communications between the adaptor first port and the adaptor third port.

12. The communications adaptor of claim 1, wherein the processor is configured by default to connect the adaptor third port to the adaptor second port when the analog telephone device initiates an outbound communication unless the processor receives a default override indication.

13. The communications adaptor of claim 12, wherein the processor is configured to generate a notification signal to the IP telephony system with information to enable the IP telephony system to make a record of the outbound communication.

14. A method in a communications adaptor comprising:
    receiving at an adaptor first port of the communications adaptor a first setup request signal for an incoming communication carried over an analog communications line;
    generating a second setup request signal for transmission to an Internet Protocol (IP) telephony system over a data network connected to an adaptor second port of the communications adaptor when the setup request signal for the incoming communication is received over the analog communications line;
    generating a third setup request signal for the incoming communication received over the analog communications line for transmission to an adaptor third port of the communications adaptor by converting the second setup request signal transmitted to the Internet Protocol (IP) telephony system, the adaptor third port of the communications adaptor being connected to an analog telephony device.

15. The method of claim 14, wherein the second setup request signal is a digital setup request signal and the third setup request signal is an analog setup request signal.

16. The method of claim 14, further comprising configuring the second setup request signal for transmission to an Internet Protocol (IP) telephony system to include an indication that the incoming communication was received at the adaptor first port.

17. The method of claim 14, further comprising transmitting the third setup request signal to the adaptor third port simultaneously with the generation of the digital setup request signal for transmission to an Internet Protocol (IP) telephony system.

18. The method of claim 14, further comprising transmitting the third setup request signal to the adaptor third port at a time delay after transmission of the second setup request signal to the Internet Protocol (IP) telephony system.

19. The method of claim 18, further comprising configuring the time delay to allow the Internet Protocol (IP) telephony system to perform a call enhancement service.

20. The method of claim 19, further comprising performing call forwarding, simultaneous ring, or sequential ring as the call enhancement service.

21. The method of claim 14, further comprising
receiving an off hook condition indication from the analog telephony device and;
in accordance with the off hook condition indication, cancelling the second setup request signal to the IP telephony system over the data network.

22. The communications adaptor of claim 14, further comprising:
receiving an off hook condition indication from an extension telephony device registered with the IP telephony system; and
in accordance with the off hook condition indication canceling the third setup request signal to the analog telephony device.

23. The method of claim 14, further comprising:
receiving a fourth setup request signal from the IP telephony system; and
using the fourth setup request signal to generate the analog setup request signal for transmission to the adaptor third port.

24. The method of claim 23, further comprising generating the third setup request signal by converting the fourth setup request signal from digital to analog.

* * * * *